Patented Oct. 26, 1954

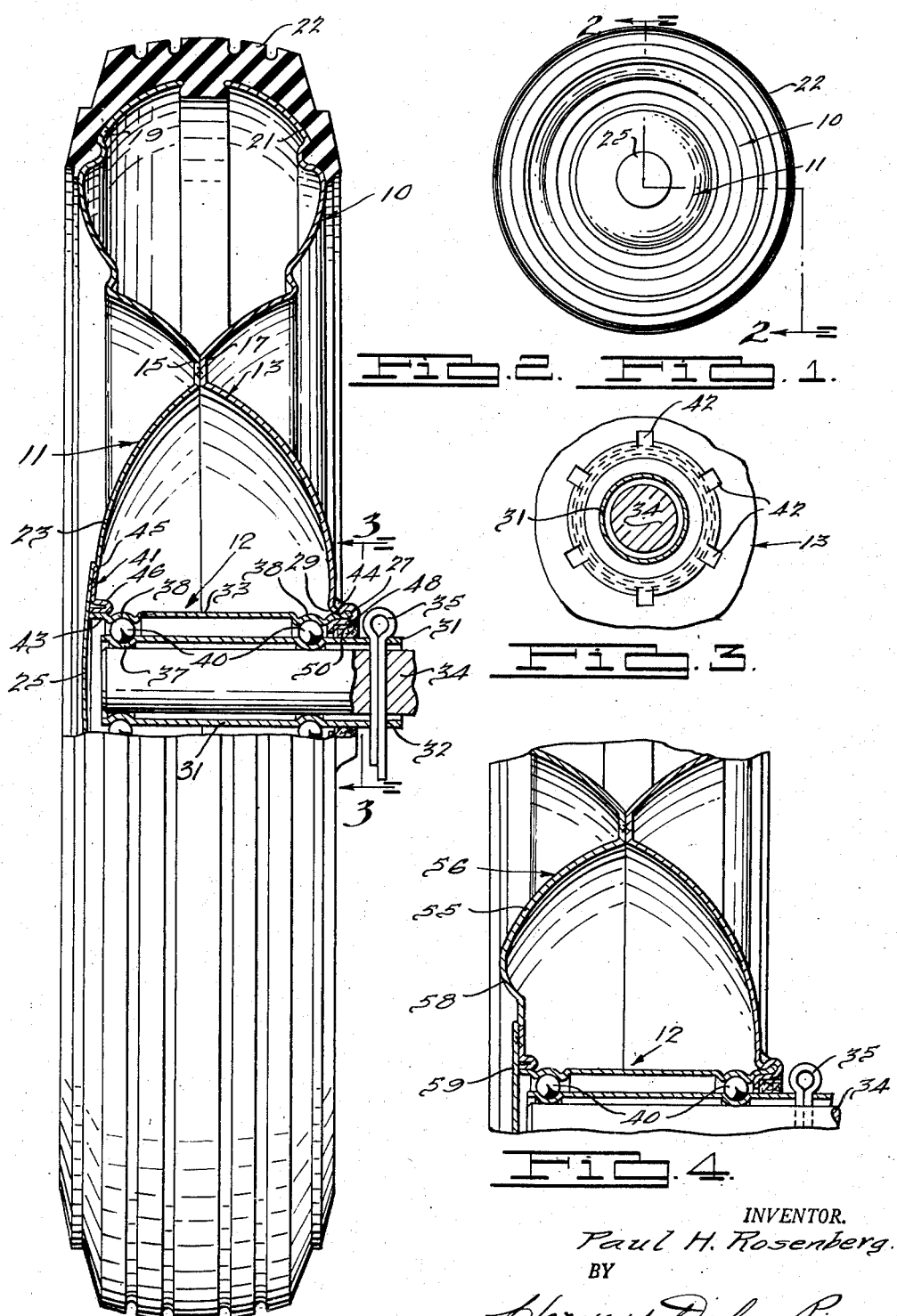

2,692,801

UNITED STATES PATENT OFFICE 2,692,801

WHEEL AND BALL BEARING MOUNTING THEREFOR

Paul H. Rosenberg, Lansing, Mich., assignor to Reo Motors, Inc., Lansing, Mich., a corporation of Michigan Application December 29, 1951, Serial No. 264,135

6 Claims. (Cl. 301—63)

The present invention relates generally to wheel constructions and more particularly to a novel and improved ball bearing assembly for rotatably supporting a wheel.

It is one of the objects of the present invention to provide a novel and improved wheel and bearing assembly therefor, which rotatably mounts the wheel on an axle without requiring protruding or exposed cotterpins, protuberances, axle nuts, etc.

Another object of this invention is to provide an improved ball bearing assembly for rotatably and positively supporting a wheel to form a strong and rugged wheel construction.

A further object is to provide a wheel and bearing mounting therefor, wherein the mounting is enclosed, thereby sealing out dirt and other foreign matter.

A still further object is to provide a wheel and bearing assembly which is inexpensive and easily manufactured from sheet metal stock, conventional tubing and balls.

Further objects and advantageous features in this invention will be specifically pointed out or will become apparent upon considering the description in its entirety.

In the drawings:

Figure 1 is an elevational view of the wheel of this invention;

Fig. 2 is a view partially in elevation and partially in section of the wheel shown in Fig. 1, taken substantially along the line 2—2 thereof;

Fig. 3 is a fragmentary sectional view of the structure shown in Fig. 2 taken substantially on the line 3—3 thereof; and Fig. 4 is a fragmentary sectional view of the wheel of Fig. 1 and showing a modification thereof.

In accordance with the present invention, there is provided an improved wheel and bearing mounting therefor, wherein the wheel is simply mounted on and supported by a bearing assembly having means included therein for receiving an axle and securing the same against axial movement during use, the outer end of the axle terminating within the bearing assembly. As a result of this type of construction, the outer contour of the wheel is continuous and uninterrupted by a projecting axle with the normally attending cotterpins, axle nuts and the like.

Referring more specifically to the drawing, there is shown in Figs. 1 and 2, a preferred embodiment of the invention comprising a wheel 10 and a bearing mounting generally designated 12. Wheel 10 is comprised of an outer section 11 and an inner section 13 which are suitably secured together in their web portions 15 and 17, respectively, by suitable means such as spot welding or the like. The peripheral portions 19 and 21 of the sections 11 and 13 respectively, are suitably indented and contoured to receive a tire 22 and to secure the same against detachment. The tire 22 may be fabricated from any suitable wear-resistant and preferably resilient material, such as rubber or the like, having complementary portions adapted to project into the inwardly disposed contours of peripheral portions 19 and 21. Outer section 11 may be fabricated from a single piece of sheet metal stock, and has in addition to the outer contoured portion 19 an enlarged axial portion 23 and an offset hub outwardly projecting portion 25. Enlarged axial portion 23 is uniformly flared outwardly from web 15 to produce an outward projection from the web approximately equal to the outward projection of peripheral portion 19, and abuts outwardly projecting hub portion 25. Hub portion 25 blends with the general uniform curvature of portion 23 reaching a peak of outward projection at the center of section 11. Inner section 13 is generally similar in shape to outer section 11, but is provided with an axle aperture 27 adapted to accommodate and receive bearing assembly 12. Section 13 is provided with an annular bead 29 immediately adjacent to aperture 27 which is adapted to receive and to secure section 13 to bearing mounting 12 as will be more fully discussed hereinafter.

Bearing mounting 12 is comprised of an inner sleeve 31 and an outer sleeve 33. Inner sleeve 31 is adapted to house axle 34 and is provided with an aperture 32 for receiving means for securing sleeve 31 to axle 34. Any suitable means may be employed for securing sleeve 31 and axle 34 such as cotterpin 35. Intermediate its ends, sleeve 31 is provided with a pair of axially disposed raceways 37, the innermost projections of which preferably closely approximate the diameter of axle 34. Outer sleeve member 33 is similarly provided with a pair of axially disposed raceways 38 which are opposed to raceways 37 when the bearing mounting is assembled. Bearing means such as balls 40 are provided and interposed between and roll in raceways 37, 38. Wheel 10 is mounted on and supported by bearing assembly 12 by means of annular bead 29 and reinforcing member 41. Annular bead 29 is pierced at a plurality of spaced points 42 therearound as may be seen in Fig. 3.

In making the wheel construction of this invention, grooves 37 are first rolled into the peripheral surface of sleeve 31 with the desired axial displacement therebetween. Balls 40 are then positioned in grooves 37 and retained therein by any suitable means such as an annular retaining ring divided into two parts at the diameter thereof, opposing a similar two-piece ring on the opposite axial side of balls 40. It will be understood that such means may be maintained in position by external mechanical means, or manually if desired. With balls 40 in position, outer sleeve 33 is slid thereover, and grooves 38 are rolled in outer tube 33. End extensions 43, 44 of outer tube 33 may be fabricated of the requisite length either by cutting sleeve 33 after the rolling operation or by taking sufficient care in positioning sleeve 33 over balls 40 to insure the desired length after rolling grooves 38 in sleeve 33. External section 11 may then be positioned in abutment with the external end of end portion 43, and maintained in pressure contact therewith by the insertion of a plurality of reinforcing members 41. The upper end of reinforcement member 40 is adapted to abut the lower surface 45 of outwardly protruding hub portion 25, and the lower U-shaped portion 46 seats forcibly against the upper surface of end portion 43 of sleeve 33. Suitable attachment may be made between external section 11 and reinforcement members 41, such as spot welding or the like. Internal section 13 may then be slid over inner sleeve 31 to establish contact between web portion 17 and web portion 15 and annular rim 29 with end portion 44. End portion 44 which extends into and is intimate with lanced portions 42 is rigidly secured thereto by crimping lanced portions 42 tightly thereagainst. It is to be noted that the axial surface of inner axial portion 48 of annular rim 29, after crimping, defines an annular slot into which a closure member 50 may be inserted. Closure member 50 may be any suitable material which is capable of absorbing and retaining lubricants and of sealing the wheel 10 to the bearing assembly 12, such as a felt washer or the like. Axle 34 may then be slid into sleeve 31 and cotterpin 35 positioned to secure sleeve 31 to axle 34. It will be noted that cotterpin 35 serves to retain sealing and lubricating means 50 against removal during operation. When thus secured together, the wheel and wheel mounting are complete and it will be noted that the cotterpin serves also to prevent axial shifting of the bearing relative to the axle and preclude accidental disengagement of the axle from the bearing.

The configuration of the side surface of external section 11 may be varied to suit the desires of the manufacturer, and one such modification is exemplified in Fig. 4. Therein it will be observed that the belled axial portion 55 of the external section 56 assumes a more pronounced outward curvature and terminates at its axially adjacent end portion in a reversed curved section 58 adjoining a vertical, slightly offset, hub portion 59. It will be noted, however, that the essential construction features utilized in the preferred embodiment are retained in the modification of Figure 4. Somewhat improved compressive strength, that is, resistance to a deformation from loads applied to the periphery of the assembled wheel, have been noted with the surface configuration of Fig. 4.

It will be apparent that the construction of this invention lends itself readily to convenient lubrication inasmuch as lubricating member 50 may be easily withdrawn and grease or oil inserted, or the bearings may be prepacked with grease if desired. While other embodiments of the invention may occur to those skilled in the art, it is apparent that the embodiments of the invention described, produce a strong, rugged, inexpensive and simple wheel and wheel mounting which rigidly supports the wheel and insures against accidental disassembly thereof during use. It will also be appreciated that the bearing construction described, insures that raceways 37, 38 will be retained in opposition, regardless of the strains or stresses which are transmitted from the wheel to the axle through the bearing assembly. It will be noted that ball bearing races assume thrust loads in either direction, and furthermore, mounting of the wheel outside the bearing races contributes greater rigidity and stability to the wheel construction than that characteristic of hitherto known constructions.

What is claimed is:

1. In a wheel and wheel mounting, a wheel comprising an inner disc element and an outer disc element in concentric relation therewith, only the inner element having a central opening to receive an end of an axle, the outer element being imperforate in its central portion, means carried by the inner and outer elements concentric with the inner element opening for receiving and supporting a bearing, a bearing supported by said means coaxial with said central opening, said elements being of duplicate form radially beyond the bearing opening, each element comprising a circular dished inner portion with the concave face thereof opposing the concave face of the other element portion, an encircling web portion defining the periphery of the dished portion, a circular radially and axially curving portion forming a continuation of the web portion and a circular reversely curving substantially arcuate peripheral portion forming a continuation of said radially and axially curving portion, said web portions being in abutting joined relation and located radially of the wheel substantially midway between the rotary axis of the wheel and the outer perimeter of the peripheral portions and the radially and axially curving portions being divergently related with their convex faces directed radially outwardly, the said arcuate peripheral portions having their edges in axially spaced relation defining an annular opening designed to assist in securing to the wheel a tire encircling and moutned on the peripheral portions.

2. In a wheel and bearing mounting therefor, an inner disc element and an outer disc element in concentric relation therewith, the inner disc element having a central opening, the outer disc element being centrally imperforate, a bearing unit comprising an inner tubular member having outwardly opening encircling raceways, an outer tubular member encircling and spaced from the inner tubular member and having inwardly opening raceways cooperating with the first raceways, bearing elements in said cooperating raceways and spacing the tubular members, said outer tubular member having one end secured to the imperforate central part of the outer disc element, means securing the other end of the outer tubular member to the inner disc element in concentric relation with said central opening, said inner tubular member having the end thereof adjacent to the outer disc element terminating short of and free of connection with the outer disc element and having its other end extending through the central opening of the inner disc element, an axle having an end extended into the inner tubular member and terminating short of the imperforate disc, and means for locking the said extended end of the inner tubular member to the axle, said bearing elements functioning to transmit axial thrust from the axle to the wheel through the tubular members.

3. The invention according to claim 2, wherein the means securing the said other end of the outer tubular member to the inner disc comprises an annular bead formed from the material of the disc and providing an inwardly opening recess around the central opening of the inner disc in which recess the said other end of the outer tubular member is clampingly secured.

4. The invention according to claim 3, wherein said bead has an annular face opposing and spaced from the extended end portion of the inner tubular member, and a lubricant retaining gasket encircling the inner tubular member in said space.

5. The invention according to claim 2, wherein the said other end of the outer tubular member is in abutting engagement with the opposing imperforate part of the outer disc element, the said imperforate part being formed with an annular shoulder on its inner face concentric with the outer tubular member, and said other end of the outer tubular member being secured by reinforcing members interposed between said annular shoulder and the wall of the outer tubular member.

6. The invention according to claim 1, with a tire encircling and mounted on said peripheral portions with an inner portion secured between said spaced edges and having an overall width greater than the wheel width providing side portions extending beyond the outer sides of said peripheral portions.

References Cited in the file of this patent

UNITED STATES PATENTS

| Number | Name | Date |
|---|---|---|
| 341,816 | Parker | May 11, 1886 |
| 596,886 | Kendall | Jan. 4, 1898 |
| 1,490,812 | Faunce | Apr. 15, 1924 |
| 1,589,965 | Herle | June 22, 1926 |
| 1,973,747 | Bukolt | Sept. 18, 1934 |
| 2,146,663 | Vaughn | Feb. 7, 1939 |
| 2,551,763 | Schley | May 8, 1951 |
| 2,576,270 | Walklet | Nov. 27, 1951 |

FOREIGN PATENTS

| Number | Country | Date |
|---|---|---|
| 15,004 | Great Britain | 1912 |
| 748,262 | France | Apr. 10, 1933 |